UNITED STATES PATENT OFFICE.

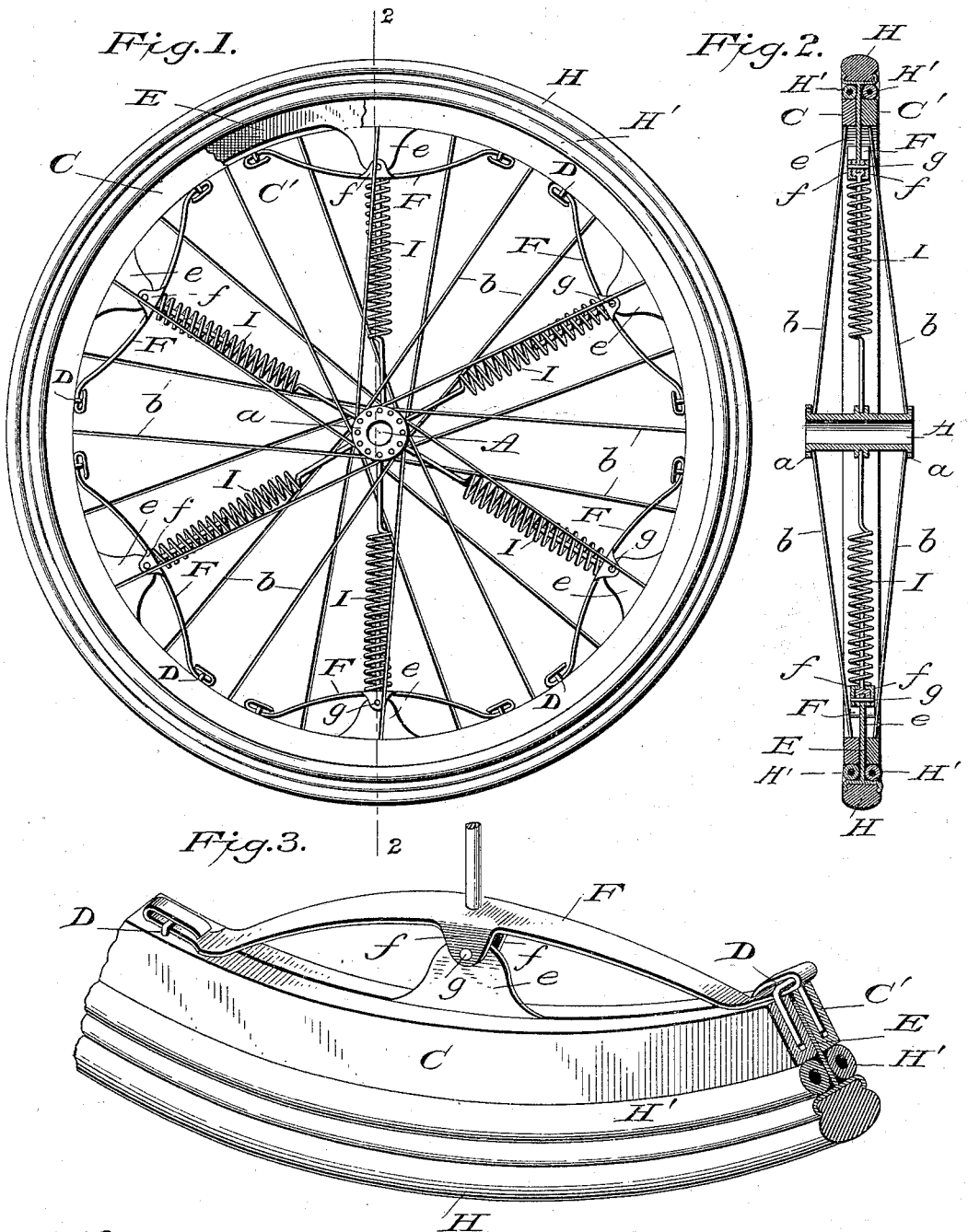

CALEB M. CURREY, OF BAY CITY, MICHIGAN.

VEHICLE-WHEEL.

SPECIFICATION forming part of Letters Patent No. 598,771, dated February 8, 1898.

Application filed September 4, 1897. Serial No. 650,562. (No model.)

*To all whom it may concern:*

Be it known that I, CALEB M. CURREY, a citizen of the United States, residing at Bay City, in the county of Bay and State of Michigan, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is an improvement in wheels, and is intended for use in connection with all classes of vehicles, being more especially applicable to bicycles to obviate the requirement for a pneumatic tire and yet possess the well-known advantages of such a tire.
The primary object of the invention is to provide a bicycle-wheel which is comparatively simple and cheap in construction, giving the required degree of resiliency or spring to relieve the frame of sudden jars in passing over rough or uneven surfaces, the disposition of the parts with relation to each other presenting practically a rigid main wheel supporting an annular plate or rim having an independent spring movement and carrying the tread portion of the wheel.

The invention contemplates the adoption of a solid-rubber tire or tread to increase the resiliency.

To the accomplishment of the foregoing objects and such others as may obviously appear the invention consists in a vehicle-wheel comprising a main rigid section and a resilient tire-section, the latter being engaged by flat springs attached at their ends to the rim of the main section, thereby permitting an independent spring movement of the said tire-section.

The invention further consists in the particular construction and combination of the parts described in the following specification and more specifically set forth in the appended claims.

In the accompanying drawings, forming part of this specification, and wherein letters are employed to designate the different parts or details referred to in the description, Figure 1 is a side elevation of a vehicle-wheel constructed in accordance with my invention, part of the near section of the rim being broken away to show the tire-support. Fig. 2 is a sectional view on the line 2 2 of Fig. 1. Fig. 3 is a detail view.

Referring more particularly to the said drawings, A designates the hub of the wheel, which may be of any approved design presenting the end flanges $a$, to which are connected the inner ends of the steel-wire spokes $b$, extending from said hub preferably at a tangent. The rim or felly of the wheel, to which the spokes are attached at their outer ends, is made up of two annular plates C C', held in proper relative position by spring-metal clips or staples D, the portion connecting the engaging members of the clip extending across the inner edge of said rim or felly between the adjoining spokes.

The construction and manner of connecting the parts just described form what I term the "main wheel" and present a rigid structure providing a space between the sections of the rim or felly to receive the part which carries the tire or tread portion of the wheel.

E designates an annular plate of spring metal which fits between the sections C C' of the rim or felly and is of a diameter to project beyond the periphery thereof. This plate or movable rim is provided at suitable intervals with extensions $e$, projecting inward beyond the inner edge of the sectional rim or felly of the main part of the wheel and between the spokes, it being understood that said spokes extend alternately to the sections of the rim and serve to tie the same, relieving the clips to a certain extent.

To the ends of the extensions $e$ of the movable rim of the wheel are attached flat springs F, the ends of which are bent into engagement with the connecting portions of the spring-clips D. The preferred manner of connecting the springs to the movable rim is by forming ears $f\,f$ at the center of the said springs to embrace the extensions $e$ and completing the connection by pins or rivets $g$.

The outer edge or periphery of the movable rim may be, and preferably is, flanged, as shown, to provide for connecting thereto a rubber tire H, and as the wheel possesses a certain degree of resiliency or spring movement it is apparent a solid tire may be employed or the resiliency increased by employing the ordinary rubber cushion-tire and interposed tubes H'.

The practical advantages of a wheel constructed as herein shown and described will be readily apparent, for the intermediate rim, having an independent movement with respect to the sectional rim which is connected to the hub, will give when the wheel passes over an uneven surface, the jar or sudden movement of said rim being taken up by the flat springs which are supported by the rim of the main part of the wheel. This relieves the frame of the vehicle of any sudden jar, and in case a rubber cushion-tire is employed in connection with the said wheel it will increase the resiliency at the tread portion and consequently improve the effectiveness of the wheel generally, presenting one that, while possessing the important advantages of a pneumatic-tire wheel, removes the seriously-objectionable feature that has not been successfully remedied—to wit, liability to puncture, causing the tire to collapse and lose its resiliency.

My improved wheel also possesses the additional advantage of not being complicated in its construction and arrangement and therefore not expensive to manufacture, the cost of the entire wheel being considerably less than one having a pneumatic tire. I also contemplate reinforcing the flat springs F by helical springs I, which extend from the hub and encircle a supporting-rod, the outer end of which passes loosely through an opening in the flat spring.

Having thus described the construction of the wheel invented by me and set forth its operation and advantages, what I claim to be new, and desire to protect by Letters Patent, is—

1. A vehicle-wheel, comprising a main rim connected to the hub by spokes in the usual manner, a movable rim supported by said main rim, springs connected to the movable rim and to the main rim, and a second set of springs extending from the hub to the movable rim, the latter having a tread-surface, substantially as shown and for the purpose set forth.

2. In a vehicle-wheel, the combination, of the main rim comprising two sections or plates connected to the hub by spokes in the usual manner, clips connecting the sections or plates to each other, a movable rim interposed between the sections of the main rim, and flat springs connected centrally to the movable rim and bent at their ends into engagement with the clips, the tread portion of the wheel being upon the movable rim, substantially as shown and decribed.

3. In a vehicle-wheel, the combination, of the main rim comprising two sections or plates connected to the hub by spokes in the usual manner, spring-metal clips connecting the sections or plates to each other, a movable rim interposed between the sections of the main rim and provided with inward extensions, flat springs connected centrally to the extensions of the movable rim and bent at their ends into engagement with the spring-clips, and a second set of springs extending from the movable rim to the hub of the wheel, the tread portion being upon the said movable rim, substantially as shown and described.

4. In a vehicle-wheel, the combination, of the main rim comprising two sections or plates connected to the hub by spokes in the usual manner, means connecting said plates to each other, a movable rim interposed between the plates and having inward extensions, and flat springs attached centrally to the extensions of the movable rim and supported at their ends in connection with the main rim; together with a second set of springs extending from the hub to the movable rim, and a rod supporting said second set of springs, the movable rim having a movement upon the rod and said movable rim carrying the tread portion, substantially as herein shown and described.

5. In a vehicle-wheel, the combination, of the main rim comprising two sections connected to the hub by spokes in the usual manner, clips connecting said sections to each other, a movable rim having a plate interposed between the sections of the main rim with projections extending beyond the inner side thereof, springs connecting the rims to each other and the movable rim to the hub of the wheel, and rubber tubes interposed between the movable and main rims, substantially as shown and described.

In testimony whereof I affix my signature in presence of two witnesses.

CALEB M. CURREY.

Witnesses:
JOHN ALLAN,
EDWARD W. PORTER.